United States Patent [19]

Tanaka et al.

[11] 4,082,252
[45] Apr. 4, 1978

[54] METHOD AND SYSTEM FOR PROCESSING MOLTEN SLAG

[75] Inventors: Yoshio Tanaka, Anou; Tatsuo Shibata, Kitakyushu; Tatsuo Matsuo, Oita; Tadao Takashima, Oita; Sankichi Hori, Oita, all of Japan

[73] Assignee: IRI-E Kosan Corporation, Fukuoka, Japan

[21] Appl. No.: 693,443

[22] Filed: Jun. 7, 1976

[30] Foreign Application Priority Data

Jun. 13, 1975 Japan .................................. 50-72217
May 11, 1976 Japan .................................. 51-54168

[51] Int. Cl.$^2$ ............................................. C03B 19/08
[52] U.S. Cl. ..................................... 266/142; 65/20; 266/241
[58] Field of Search ................... 75/24; 266/276, 122, 266/137, 142, 201, 241; 65/19, 20

[56] References Cited

U.S. PATENT DOCUMENTS

| | | | |
|---|---|---|---|
| 2,212,962 | 8/1940 | Stuart et al. | 65/20 X |
| 2,702,967 | 3/1955 | Vorwerk | 65/20 |
| 3,607,168 | 9/1971 | Grady | 65/20 X |
| 3,963,223 | 6/1976 | Eysn | 266/241 |

Primary Examiner—Gerald A. Dost
Assistant Examiner—Paul A. Bell
Attorney, Agent, or Firm—Frank J. Jordan

[57] ABSTRACT

A method and system for processing molten slag is characterized in that molten slag is first spread onto a slag receiving means which is substantially made of a steel plate of desired thickness and is tiltably mounted on the floor of a roofed slag processing factory and is subsequently air and water-cooled such that the slag is solidified and finally is water-quenched in a cooling water pit whereby the resulting solidified slag is of practical use which neither collapses nor produces dust.

13 Claims, 22 Drawing Figures

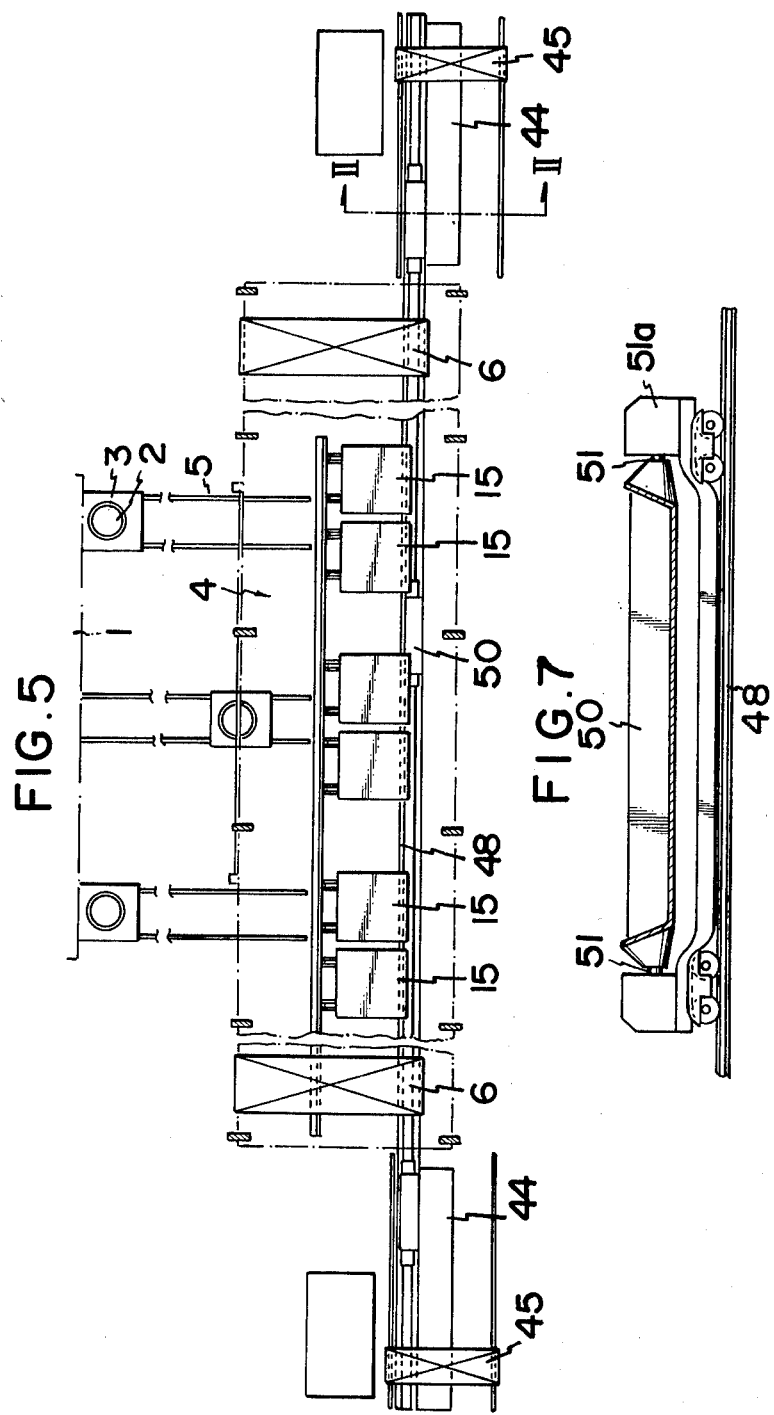

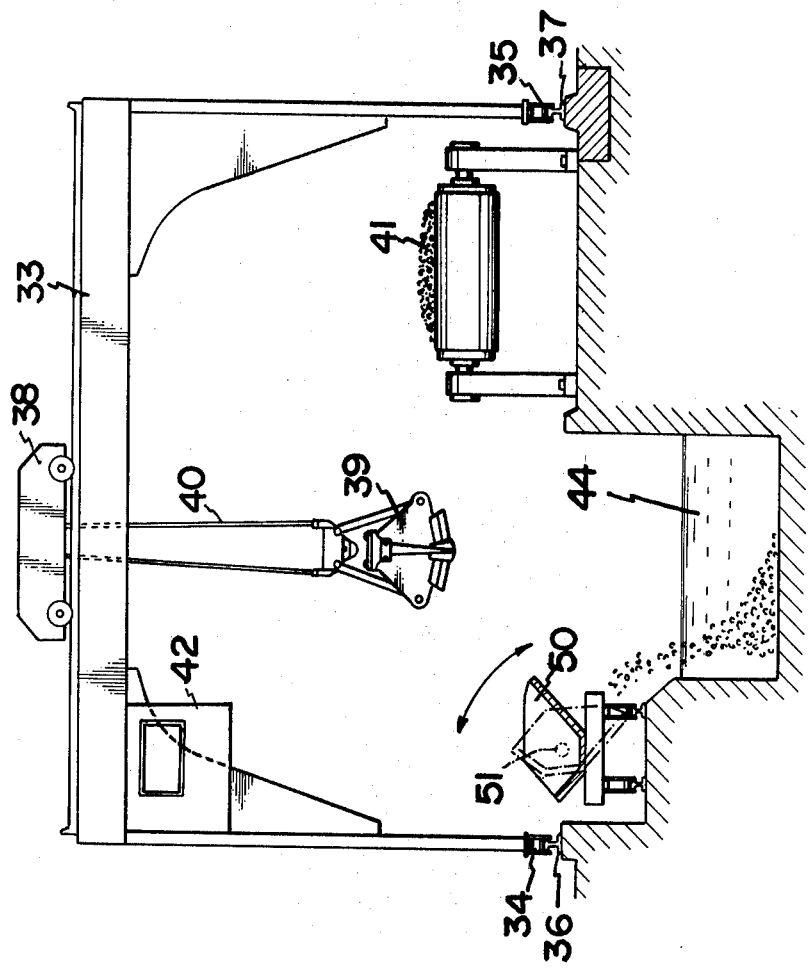

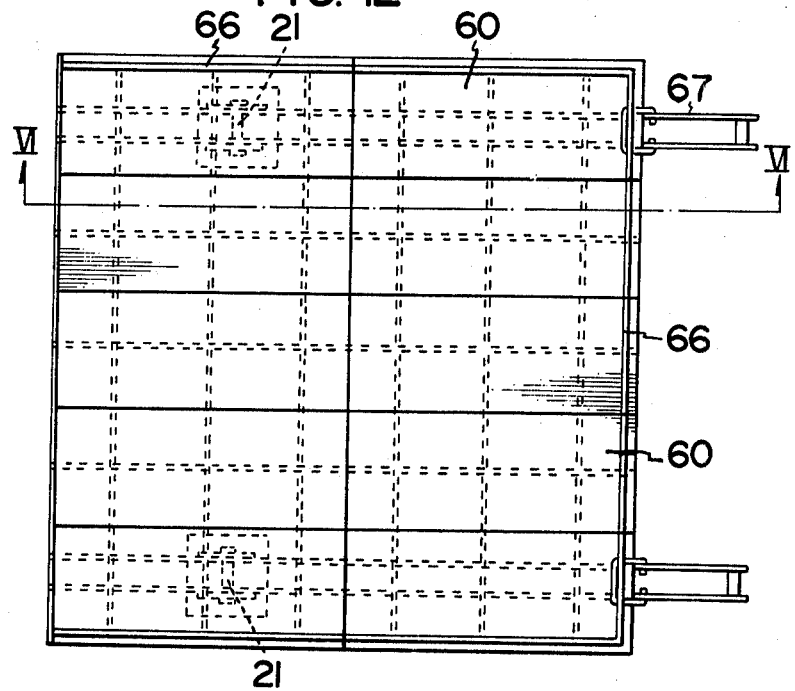
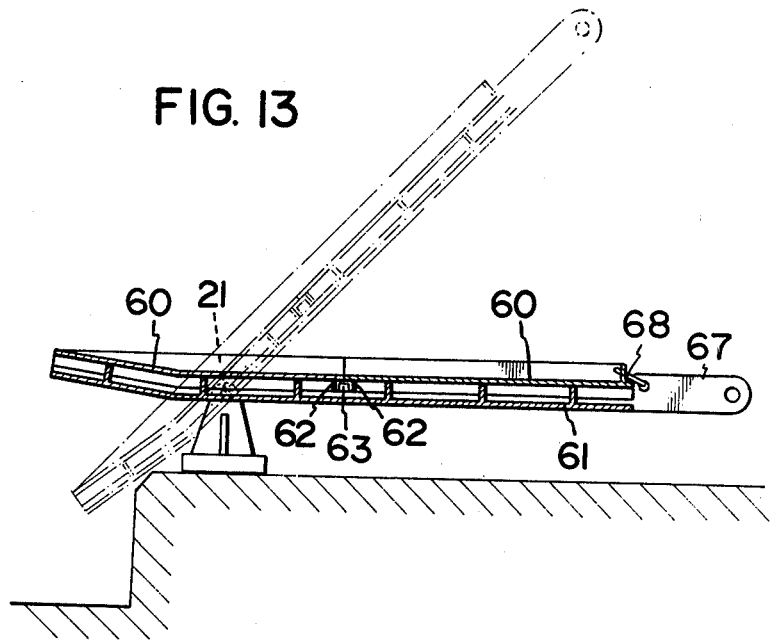

METHOD AND SYSTEM FOR PROCESSING MOLTEN SLAG

BACKGROUND OF THE INVENTION

This invention relates to a method and a system for processing molten slag and eventually for producing solidified slag which can be used as a construction material instead of natural gravel or the like.

Conventionally the slag which is discharged in great quantity from the refinery processes of a steel making plant is merely air-cooled so that the slag dusts or collapses or produces the yellow colored water which contains sulfur and hydrogen sulfide all of which lead to environmental pollution.

The conventional method for processing molten slag is called the "field method" wherein the molten slag is extensively spread onto a field and is air cooled for a longer period. This method, however, has required a lengthy series of operations. Furthermore the solidified slag cuts deeply into the field or ground so that the thickness of the layer of the spread slag becomes irregular whereby the removing operation that is usually conducted after the slag has completely solidified becomes extremely difficult and produces a tremendous amount of dust leading to air pollution. The processed slag which is produced by this conventional method still contains the non-reacted lime or an unstable phosphorus material therein so that the slag collapses and the above mentioned yellow colored water is produced which necessitate difficult methods of treatment.

For the purpose of resolving the problems which afflict conventional methods, various improvements have been made wherein the slag in the molten stage is rapidly cooled by a desired means in order to prevent the occurrence of collapse of the slag and the production of yellow colored water.

The inventors of this application also have applied for a patent on a method for processing molten slag in Japan wherein the slag in the molten stage is spread extensively on a steel plate. However, the improved methods including the above mentioned inventors' method have proved unsuccessful from the practical point of view and have included various problems yet to be resolved.

It is an object of the present invention to provide a method and a system which can resolve the aforementioned defects of conventional methods and systems.

It is another object of the present invention to provide a method and system for processing molten slag which is characterized in that molten slag is first discharged onto the desired slag receiving means is a roofed slag processing factory and then is air and water cooled and finally is water-quenched so that the solidified slag of practical use which neither collapses nor produces dust.

It is still another object of the present invention to provide a method and a system for processing molten slag in a roofed slag processing factory without causing air polution.

It is further an object of the present invention to provide a method and a system for processing molten slag which is characterized in that all the necessary devices for processing molten slag are arranged in a roofed slag processing factory systematically and compactly.

BRIEF DESCRIPTION OF THE DRAWINGS

FIG. 5 is a schematic plan view of the system showing the arrangement of the devices of the second embodiment.

FIG. 6 is a cross sectional view of FIG. 5 taken along the line II—II in FIG. 5.

FIG. 7 is a cross sectional view of FIG. 4 taken along the line III—III in FIG. 4 showing the detail of the tram car and the slag bucket which is rotatable on the tram car.

FIG. 12 is a plan view of a modified slag receiving means of this invention.

FIG. 13 is a cross sectional view of FIG. 12 taken along the line VI—VI in FIG. 12.

DETAILED DESCRIPTION OF THE INVENTION

The method and system for processing molten slag is described in the following embodiments.

FIRST EMBODIMENT

Figure 1:
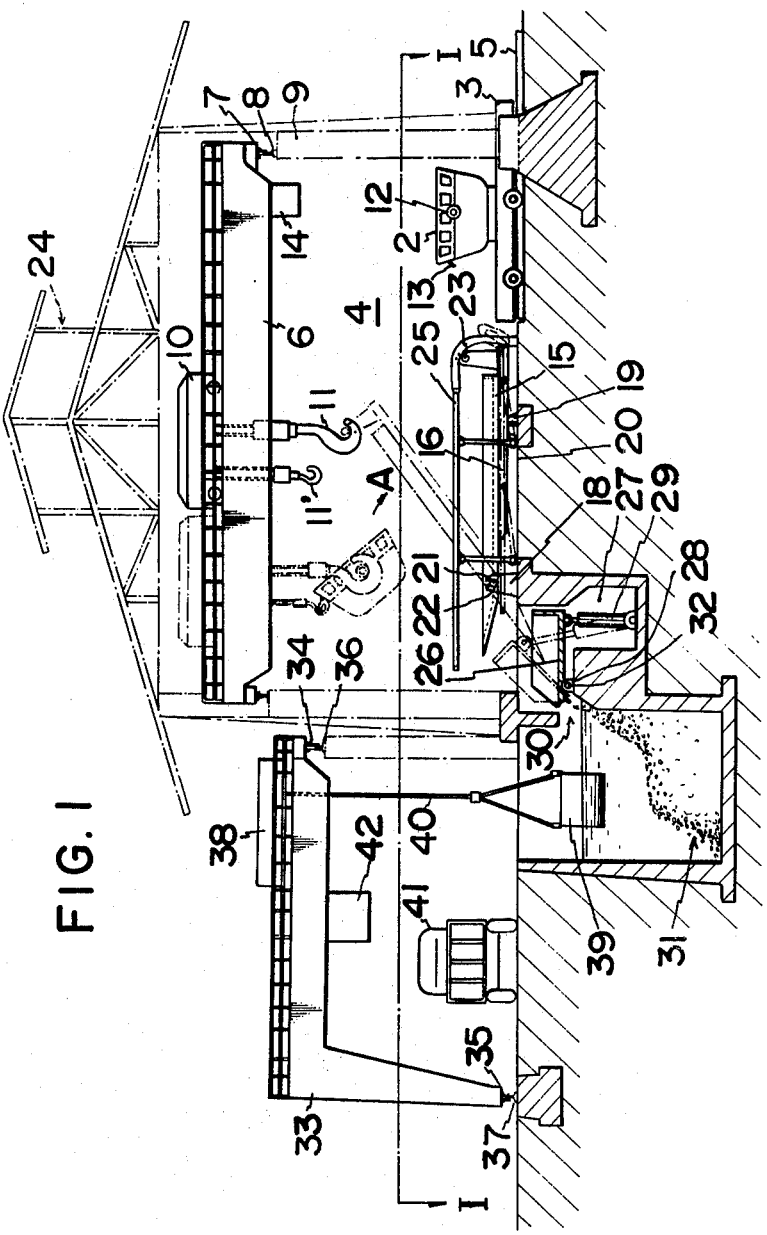
FIG. 1 is a front view of the system according to a first embodiment of this invention.
Figure 2:
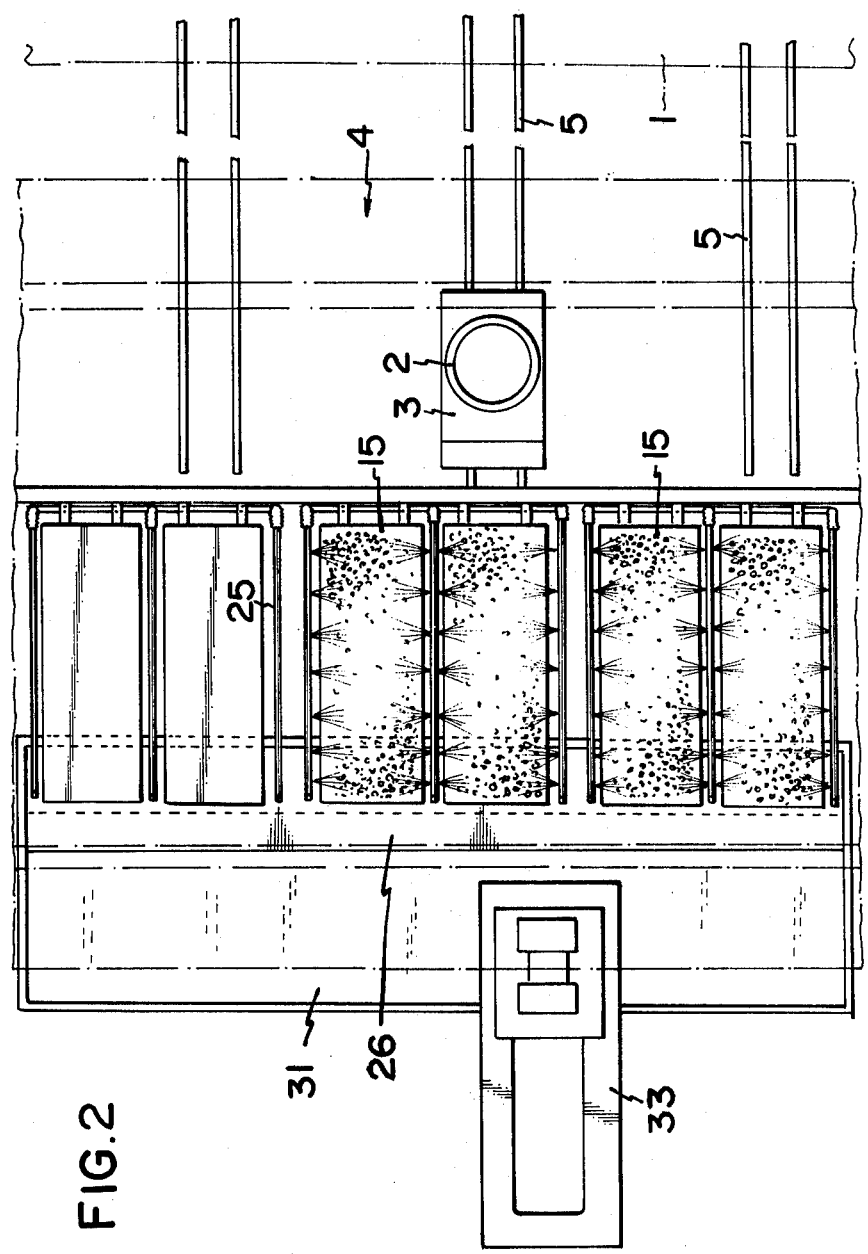
FIG. 2 is a cross sectional plan view of FIG. 1 taken along the line I—I in FIG. 1.
Figure 3:
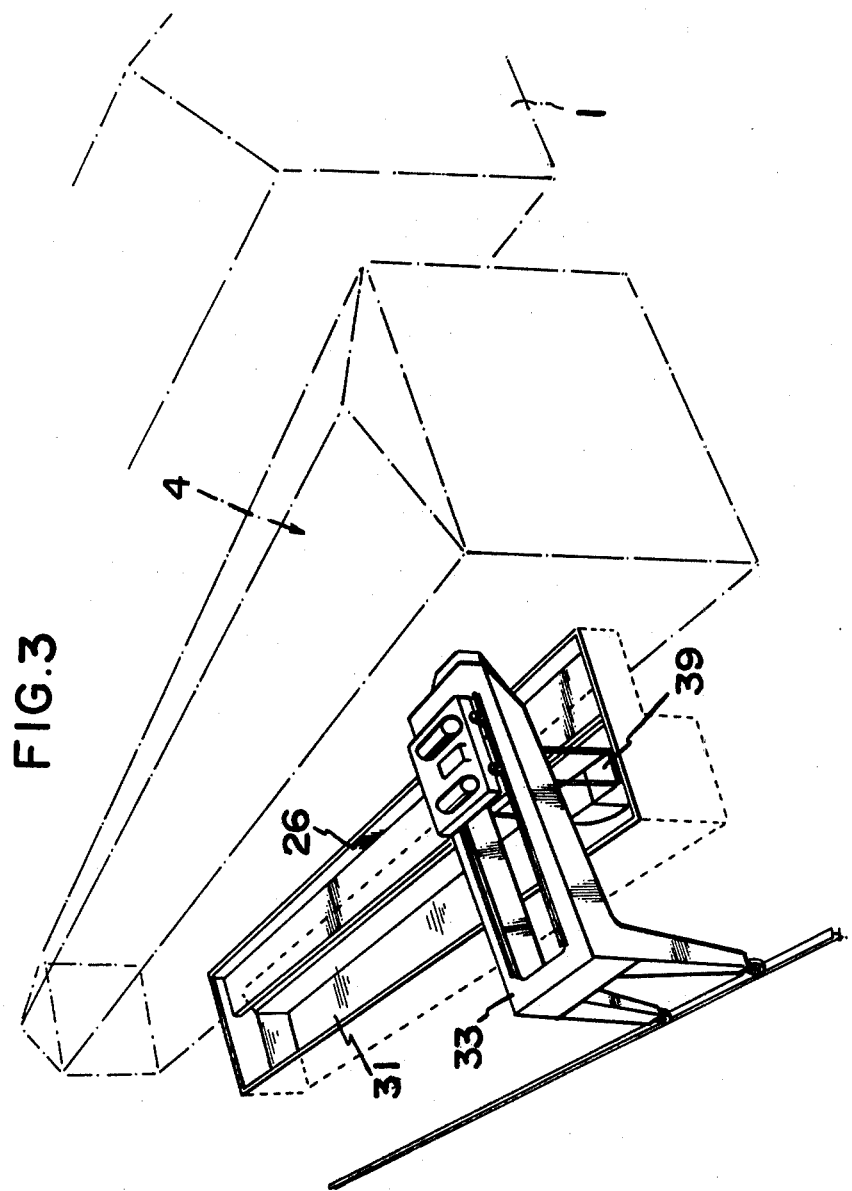
FIG. 3 is a perspective view of the system of the above embodiment showing especially the cooling water pit and intermediate cooling bucket.
Figure 4:
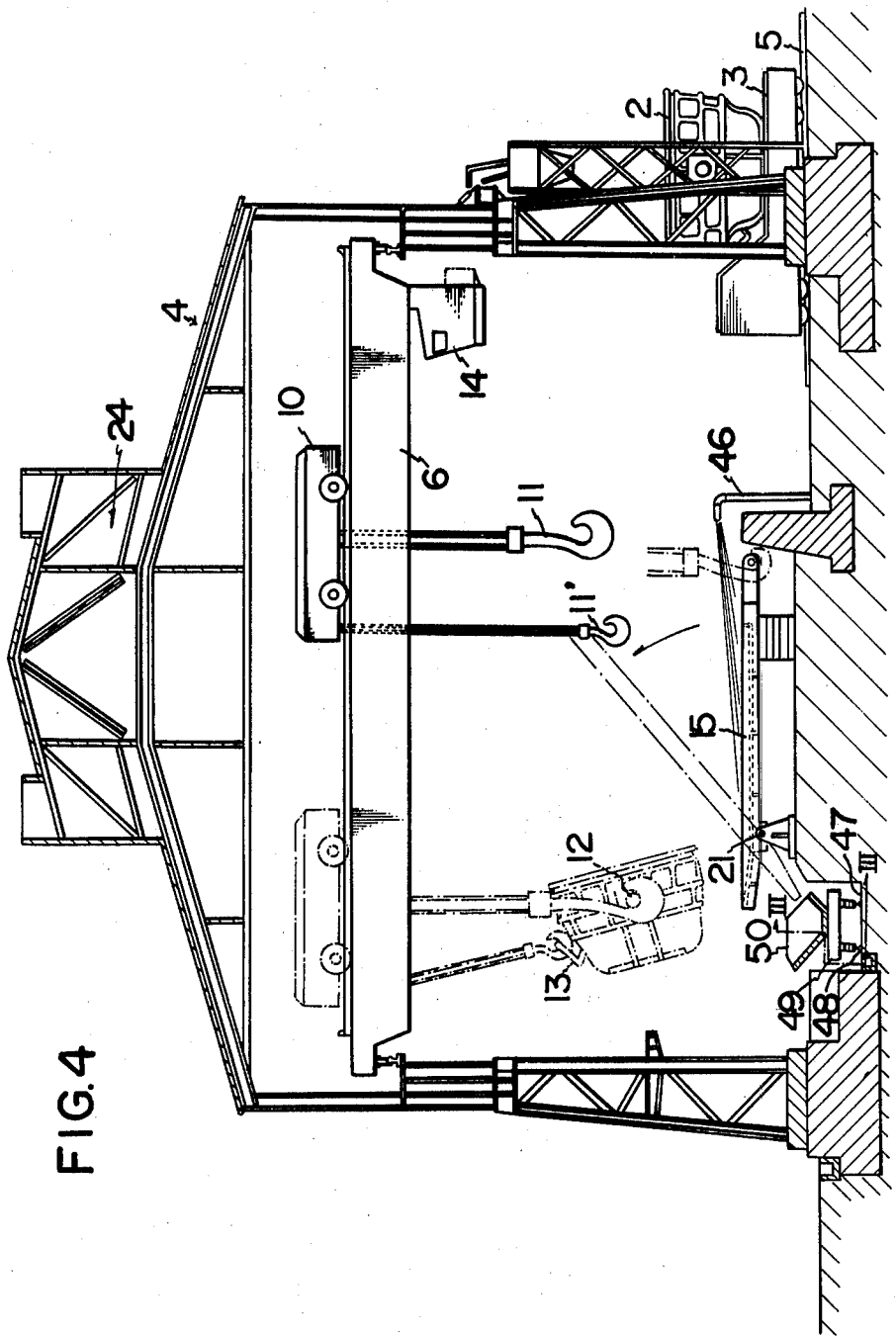
FIG. 4 is a front view of the system of the second embodiment of this invention.
Figure 8:
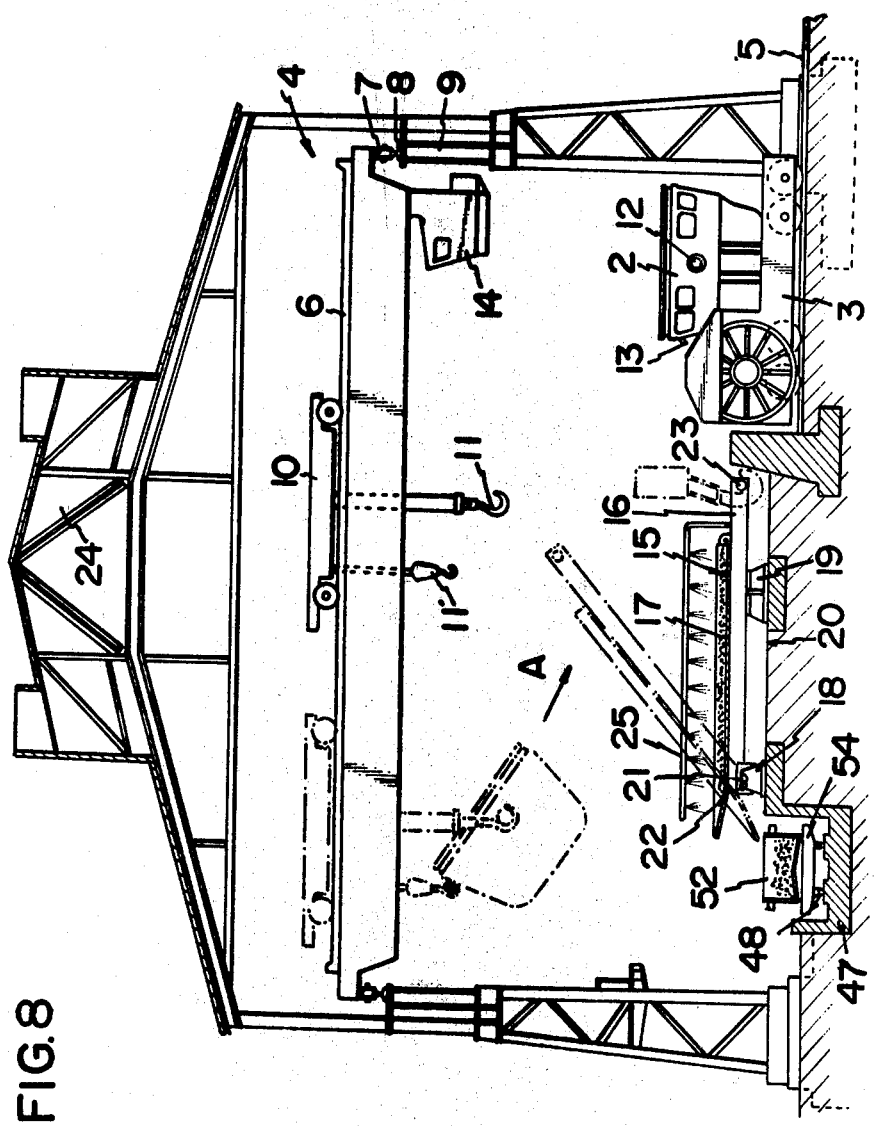
FIG. 8 is a front view of the system of the third embodiment of this invention.
Figure 9:
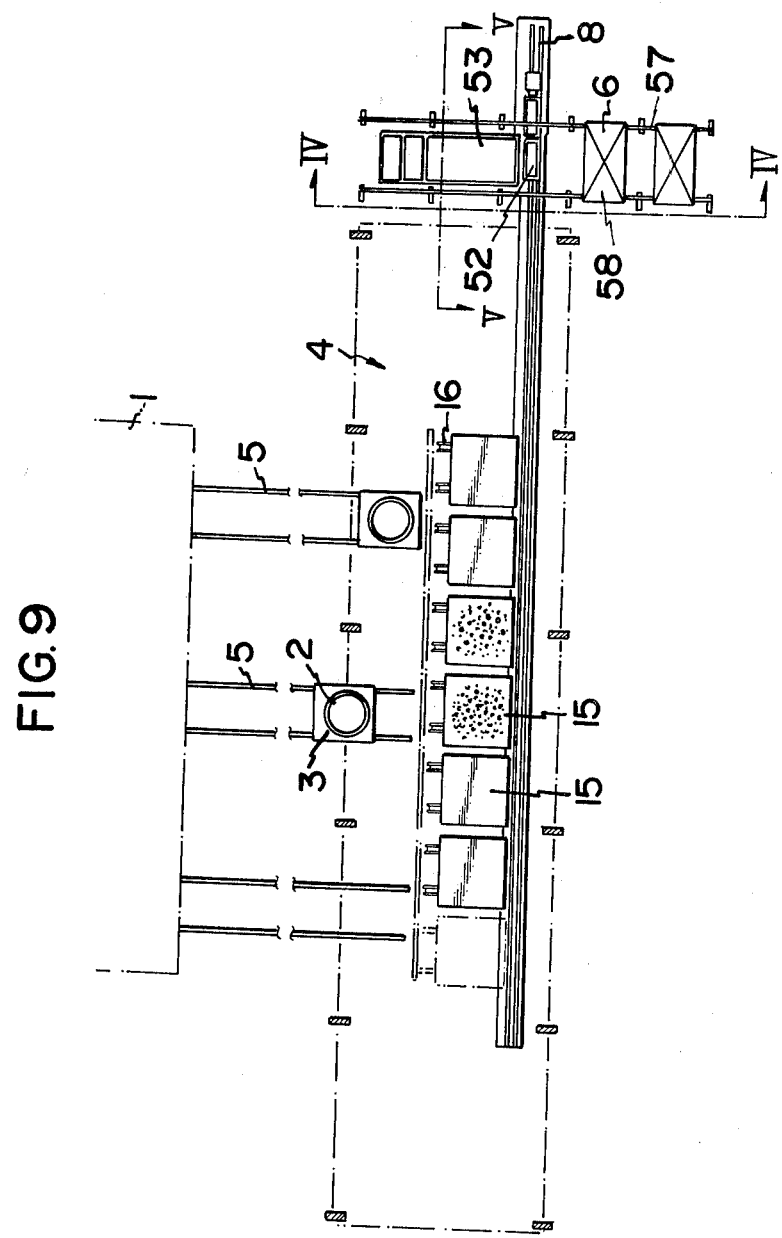
FIG. 9 is a schematic plan view of the system showing the arrangement of the devices of the third embodiment.

The arrangement and construction of a system which is employed in this first embodiment are described in detail in conjunction with the attached drawings, FIG. 1 through FIG. 3.

In FIG. 2 and FIG. 3, numeral 1 indicates a steel making plant where molten slag is discharged from a converter furnace to a molten slag ladle 2 which is mounted on a ladle transport car 3. This transport car 3 is transferred from the steel making plant 1 to a slag processing factory 4 on rails 5 installed between plant 1 and factory 4.

In the slag processing factory 4, numeral 6 indicates an overhead ladle crane which is movable in the longitudinal direction of the factory 4 in such a way that the wheels 7 which are provided at both ends of the crane 6 are rotated on rails 8 which are in turn mounted on girders 9 extending at both sides of the factory 4. This ladle crane 6 is further provided with a crab means 10 which can be moved transversely on the beam of the crane 6.

Two crane hooks 11 and 11' are suspended from the crab means 10 for the purpose of hoisting the molten slag ladle 2 from the transport car 3 by engaging the hooks 11,11' with a hoist shaft 12 and a lug 13 of the molten slag ladle 2 respectively.

Numeral 14 indicates an operator's cabin where an operator can control the movements or operations of the crane 6. A plurality of slag receiving means 15, each of which comprises a frame 16 and a slag holding pan 17 are mounted on two support frames 18 and 19, which are fixedly mounted on a central raised platform 20 of the slag processing factory 4. One side of this slag receiving means 15 is provided with a pivotal shaft 21 which is rotatably rested within a recess 22 formed on the first support frame 18 which is fixedly mounted on the corresponding end of the raised platform 20 while the other side of the frame 16 is provided with a hoist shaft 23 so that the slag holding pan 17 is inclined on the pivotal shaft 21 when the hoist shaft 23 is hoisted by the crane hook 11.

On the top of the slag processing factory 4, there is mounted a monitor top 24 which efficiently discharges the vapor produced when water is sprayed onto the molten slag on the slag holding pan 17.

Numeral 25 indicates sprinkler means which are disposed between each two slag receiving means 15 for the purpose of spraying water on the surface of the molten slag spread onto the slag holding pan 17.

A cooling bucket 26 is disposed within a chamber 27 which is located at a sub floor level of the slag processing factory 4 and extends perpendicular to the slag receiving means 15 in such a way that one side of the bucket 26 is pivotally connected to an actuating rod of a vertical hydraulic cylinder 29 wherein a support frame 28 and the vertical hydraulic cylinder 29 are both mounted on the floor of the chamber 27.

The chamber 27 has a longitudinal opening 30 formed on the side wall thereof by which the chamber 27 is communicated with a cooling water pit 31 which is integrally and adjacently constructed with the chamber 27.

Opening 30 is arranged such that the bottom plate of the intermediate cooling bucket 26 closes the opening 30 when the bottom of the cooling bucket 26 is parallel to the floor level of the slag processing factory 4 and opens when the cooling bucket 26 is inclined relative to an axis 32 by the hydraulic cylinder 29. Numeral 33 indicates a gantry crane which is movably disposed parallel to and over the water cooling pit 31. The gantry crane 33 is movable over the cooling water pit 31 in such a way that wheels 34 and 35 are rotated on rails 36 and 37 respectively. This gantry crane 33 comprises a crab means 38 which is capable of running on the beam of the crane 33 and suspends a crab bucket 39 by way of crane ropes 40. This crab bucket 39 is employed for scooping the solidified slag from the cooling water pit 31 and subsequently transferring the slag to a location where the slag is discharged into a transfer means 41 such as a truck which is disposed below the crane 33. Numeral 42 indicates an operator's cabin where an operator can control the operation of the crane 33.

The manner or the method in which the system of this embodiment is operated is hereinafter described in conjunction with the drawings.

As shown in the drawings, molten slag is carried from the steel making plant 1 to the roofed slag processing factory 4 by means of the molten slag ladle 2 which is conveyed on rails 5 laid between the plant 1 and factory 4. The conveyed molten slag is extensively spread onto the pans 17 by means of the crane 6 and crane hooks 11 and 11'. Then the spread slag is air cooled until the molten slag is substantially solidified and subsequently it is water cooled by sprinklers 25 so that the slag is further cooled and solidified. The solidified slag is transferred into the intermediate cooling bucket 26 by tilting the pan. This bucket 26 is constructed such that the bottom plate of the bucket 26 usually closes the opening 30 through which the slag is discharged into the cooling water pit 31. The same bottom plate opens the opening 30 when the bucket 26 is inclined on the axis 32 disposed at the opening side of the pan 17 whereby the solidified slag is discharged into the cooling water pit 31 where the solidified slag is water quenched whereby the solidified slag of practical use is produced.

It must be noted that the solidified slag is charged into the cooling water pit 31 after assuring that the slag is completely solidified because when slag which has a portion thereof in the molten stage is cast into the water pit 31, it may cause an explosion. Subsequently the slag in the cooling water pit 31 is scooped by the crab bucket 39 and is carried from the plant.

As has been described heretofore, by the transfer of the solidified slag into the intermediate cooling bucket 26, the slag can be checked to ensure that the slag is completely solidified and explosions can be prevented.

It is desirable that molten slag within the ladle 2 be discharged onto the slag receiving means 15 by tilting the ladle 2 toward the transport car 3 in the direction of arrow A so that molten slag does not fall from the pan 17.

When the cooling water is sprayed onto molten slag on the pan 17, the slag is cooled and solidified. Since the contraction rate varies depending on the portions of the slag, cracks occur in the slag so that the sprayed water infiltrates into the slag and the boundary formed between the slag and the surface of the pan 17 whereby the cooled and solidified slag does not adhere to the surface of the pan 17.

Therefore, when the pan 17 is tilted by a suitable means, the slag smoothly slides off the pan 17 and is discharged into the slag bucket 26.

The amount of water to be sprayed for cooling molten slag on the pan 17 is about 10 to 20 cubic meters per 30 tons of molten slag. In this case, the thickness of the molten slag spread over the pan 17 is from 50 to 150mm. The molten slag is air cooled for 30 to 90 minutes after the above water cooling so that the temperature of the molten slag is decreased to below 500° C and the molten slag is solidified. The thus solidified slag is discharged into the bucket 26 by tilting the pan 17.

In this embodiment, the processing of molten slag discharged from a converter furnace has been described.

However, it is easily understood by those who are skilled in the art that the method and system of this invention are applicable to the processing of molten slag from a blast furnace or the like, and also have the following advantages;

1. When the water is sprayed onto the molten slag which is spread onto the pan, the slag is cooled and solidified and cracks occur on the slag so that the water infiltrates between the solidified slag and the pan whereby the adhesion of the slag to the pan can be prevented. Therefore, the cooled, solidified slag is discharged easily and completely by merely tilting the pan. During the above discharging, the cracked slag is further crushed by the interaction between the pieces of cracked slag resulting in the simplification of the subsequent water-quenching operation at the water cooling pit. Furthermore, when the slag is quenched in the water cooling pit, the slag which contains a great quantity of non-reacted calcium oxide causes the chilling phenomenon wherein the friable calcium oxide portion of the slag instantly departs from the slag and then the surface of the remaining slag is chilled. In other words, the slag forms the hard chilled surface thereof so that the slag which neither collapses nor forms dust can be used as gravel or ballast.

2. Since the operations for processing molten slag is conducted in the roof covered factory, the rain which may cause the explosion of molten slag when it directly falls on molten slag is averted whereby the above operations are free from explosion even on rainy days.

3. Since the molten slag which is continuously discharged from the furnace is received on a plurality of pans, the operational efficiency is improved.

4. Since molten slag is substantially cooled by water, whirling of dust within the slag processing factory can be almost entirely prevented.

5. Since the above operations can be continuously conducted and also are remotely controlled, the operations require less labor and smaller working space whereby the productivity and the operability of the system are greatly improved.

SECOND EMBODIMENT

The arrangement and construction of the devices which are employed in this second embodiment are described in great detail in conjunction with the attached drawings, FIG. 4 through FIG. 7 wherein the same numerals are used to indicate the devices which have already been disclosed in the first embodiment.

This embodiment is characterized in that a longitudinal cooling pit 44 and an overhead gantry crane 45 are both disposed parallel to the side of the slag processing factory 4. With respect to other features of this embodiment, numeral 46 indicates sprinkler means for spraying water onto the molten slag from the left direction. Since the sprinkler means 46 are not located between the slag receiving means 15, the sprinkler means 46 is less subject to troubles caused by the heat of molten slag on the slag receiving means 15. Adjacent to and perpendicular to the pivoting side of the slag receiving means 15, a track 47 is formed at the sub floor level of the slag processing factory 4. Along and with the track 47, rails 48 are extended such that both ends of the rails 48 reach both ends of the slag processing factory 4 where the cooling water pits 44 are provided. A tram car 49 is movably mounted on rails 48. Numeral 50 indicates a slag bucket which is rotatably mounted on the tram car 49 in such a way that the slag bucket 50 has two shafts 51 which are rotatably on rotating means 51a such as power-operated motors. The slag bucket 50 is inclined corresponding to the rotation of the shafts 51 so as to discharge the solidified slag laid on the bucket 50 into the cooling water pit 44.

In this embodiment, molten slag in the ladle 2 is spread onto the entire surface of the slag receiving means 15 and is cooled by air and water for a predetermined time in a way described in the first embodiment.

The solidified slag is then charged into the slag bucket 50 by inclining the slag receiving means 15 with the overhead ladle crane 6. Subsequently the solidified slag in the slag bucket 50 is transferred to the location adjacent to and over the cooling water pit 44 and is discharged from the slag bucket 50 into the cooling water pit 44 by inclining the bucket 50 with the rotation of the shaft 51 after making sure that the slag in the bucket 50 is completely solidified. The solidified slag thus accumulated within the cooling water pit 44 is scooped by the crab bucket 39 and is transferred to a location where the solidified slag within the crab bucket 39 is discharged onto the conveyor 41 and is transferred from the slag processing factory 4 to the desired destination.

According to this embodiment, molten slag is processed or treated rapidly and with extreme safety as has been described in the first embodiment while the solidified slag of practical use which never collapses or dusts is produced.

THIRD EMBODIMENT

The arrangement and construction of the devices which are employed in this third embodiment are described in great detail in conjunction with the attached drawings FIG. 8 through FIG. 11 wherein the same numerals are used to indicate the devices which have already been disclosed in the first and the second embodiments.

This embodiment is characterized in that the solidified molten slag contained in a slag bucket 52 is discharged into a cooling water pit 53 which is disposed adjacent to one of the rails 48 while being contained in the slag bucket 52.

Numeral 54 indicates a tram car on which the box-like slag bucket 52 is replaceably mounted. This slag bucket 52 has the central portion of the bottom thereof slightly raised and has a number of apertures 55 at the lower portion of the respective side thereof so that water may be discharged through these apertures 55 when the bucket 52 is hoisted from the cooling water pit 53 by a gantry crane 57 which is disposed perpendicular to the track 47 and which also can be moved over the cooling water pit 53.

Figure 10:
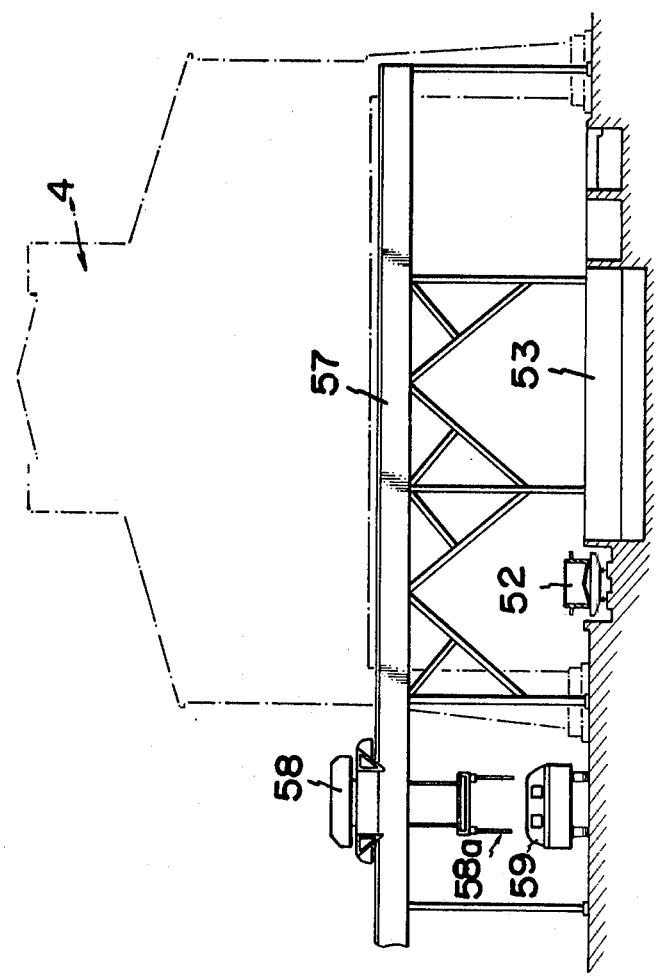
FIG. 10 is a cross sectional view of FIG. 9 taken along the line IV—IV in FIG. 9.
Figure 11:
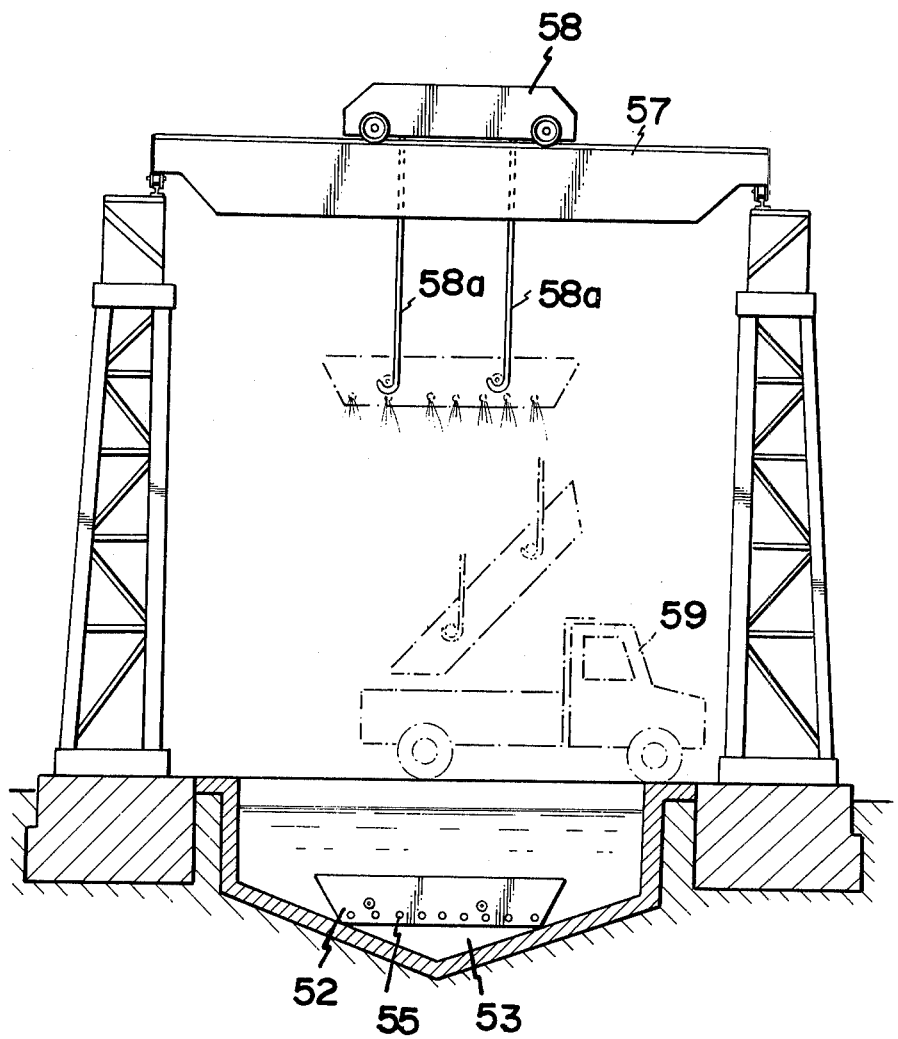
FIG. 11 is a cross sectional view of FIG. 9 taken along the line V—V in FIG. 9.
Figure 14:
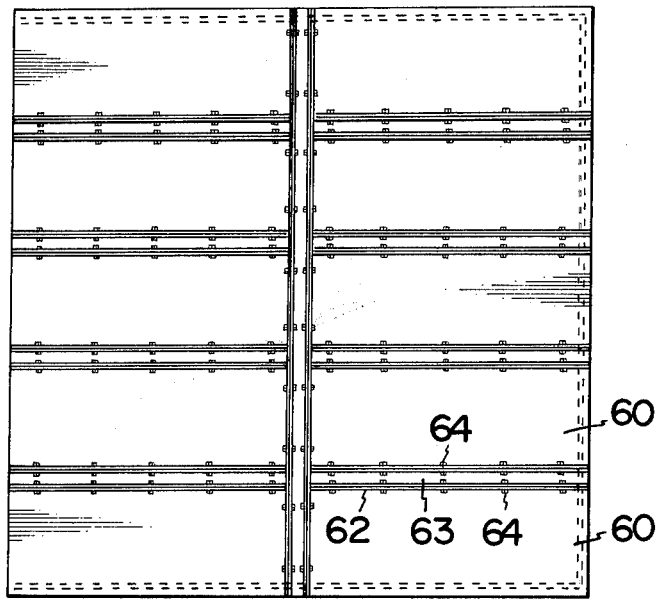
FIG. 14 is a bottom view of the slag holding pan.
Figure 15:
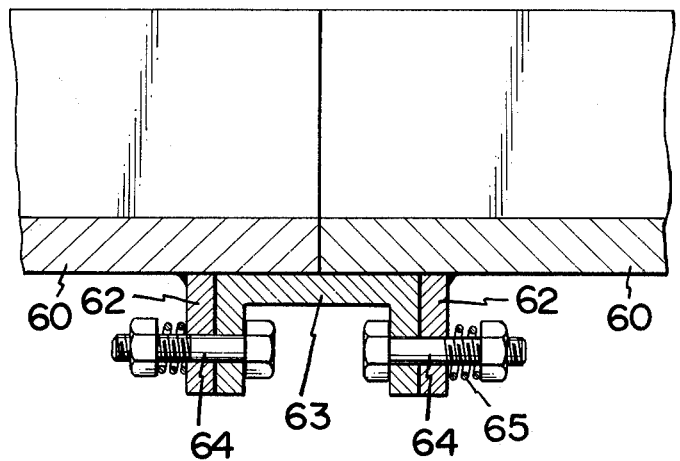
FIG. 15 is an enlarged partial view of FIG. 13 showing the detail of the connecting portion of the slag holding pan.

Referring now to FIG. 10 and FIG. 11, a crab means 58 which is provided with crane hooks 58a is movably mounted on the entire length of the girder of the crane 57 so that the crab 58 can move from the cooling water pit 53 to the location where solidified slag is discharged into a transfer means 59 such as a truck.

The method or manner in which the system of this embodiment efficiently processes the molten slag is described hereinafter.

1. Molten slag from the converter in the steel making plant 1 is received in the molten slag ladle 2 which is then mounted on the transport car 3 and is transferred to the roof covered slag processing factory 4.

2. Molten slag which is received within the molten slag ladle 2 is spread onto the slag holding pans 17 by a suitable means including the crane 6 in such a way that the thickness of the spread slag becomes as thin as possible.

3. After air cooling for a predetermined period for solidifying the molten slag, the cooling water is sprayed onto the molten slag spread on the pan 17 by means of the sprinkler means 25 so that the slag is rapidly cooled and further solidified.

4. The pan 17 is tilted at an angle of 30° to 40° by means of the crane 6 or a hydraulically actucated device so that the solidified slag on the pan 17 is discharged into the bucket 52 which is mounted on the tram car 54.

5. The tram car 54 is moved on the rails 48 to a location adjacent to the cooling water pit 53 which is disposed at one end of the roof covered slag processing factory 4. There, the bucket 52 is hoisted by the gantry crane 57 which moves at right angles to the rails 48 and is discharged in the cooling water pit 53 where the slag contained in the bucket 52 is water quenched.

6. After complete quenching of the slag is achieved within the cooling water pit 53, the bucket 52 is again hoisted by the gantry crane 57 and is moved to a location where the slag within the bucket 52 is transferred to the suitable transfer means 59 such as a truck which transfers the slag from the plant.

According to this embodiment, since the bucket 52 which contains the solidified slag is water-quenched in the cooling pit 53, slag falling in the pit 53 can be minimized as much as possible. Thereby the circulation of the water can be conducted smoothly.

FIG. 12 through FIG. 17 describe a modification of the slag receiving means which is characterized in that slag holding pan is made of desired numbers of sectional plates. The above slag receiving means of the embodiments heretofore described is made of a steel plate or a slab which usually has a thickness of 80mm.

When molten slag is water-cooled by the sprinkler means after being spread onto the entire surface of the slag holding pan, the temperature of the slag drops sharply from about 1600° C to about 400° through 500° C. Therefore the slag holding pan is also subject to the above temperature drop of about 1000° C so that the pan repeats the expansion and contraction thereof each time molten slag is processed on the pan.

The sharp change of the shape of the pan caused by the above temperature difference eventually causes rupture or cracks thereof and the pan is no longer usable.

In the drawings, FIG. 12 through FIG. 15 which precisely describe the modification of the slag receiving means, numeral 60 indicates sectional plates which are disposed over a frame 61 to form the slag holding pan 17. Longitudinal rib means 62 are fixedly secured to the bottoms of respective plates 60 adjacent and symmetrical to the joint surfaces of the sectional plates 60. A longitudinal channel frame 63 is disposed between these symmetrical rib means 62. Numeral 64 indicates a nut and bolt means which is used to connect the rib means 62 and the side plate of the channel frame 63 fixedly with the aid of a spring means 65 which is disposed over the bolt between the rib means 62 and the nut; numeral 66 indicates a peripheral plate which is attached to the periphery of the slag holding pan 17 except for one side from which the solidified slag is discharged; numeral 67 indicates protruding frames which have one end perpendicularly secured to the side of the frame 61 and is employed to be engaged with the crane hook 11 of the crane 6; and numeral 68 indicates a connecting means which connects the frame 61 and the slag holding pan 17 formed by the sectional plates 60.

Figure 17:
FIG. 17 is a cross sectional view of the slag holding pan of this modified slag receiving means when the pan is expanded due to the high temperature of molten slag.
Figure 16:
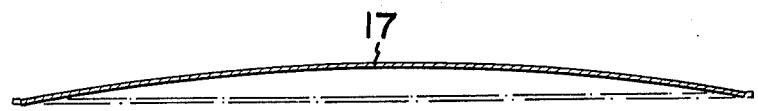
FIG. 16 is a cross sectional view of the slag holding pan which is made of a steel sheet when the pan is expanded due to the high temperature of molten slag.

Due to the above construction, the slag holding pan 17 will have the deformation thereof as shown in FIG. 17 (FIG. 16 shows the deformation of a slag holding pan which is made of a steel sheet) so that the deformation of the former can be reduced greatly compared to the deformation of the latter. Furthermore, when one of the sectional plates 60 becomes non-usable, it can be easily replaced with a new one due to the specific construction which was described heretofore.

FIG. 18 through FIG. 22 describe another modification of the slag receiving means which is characterized in that the slag holding pan includes the water-cooling means for cooling the slag holding pan.

Figure 18:
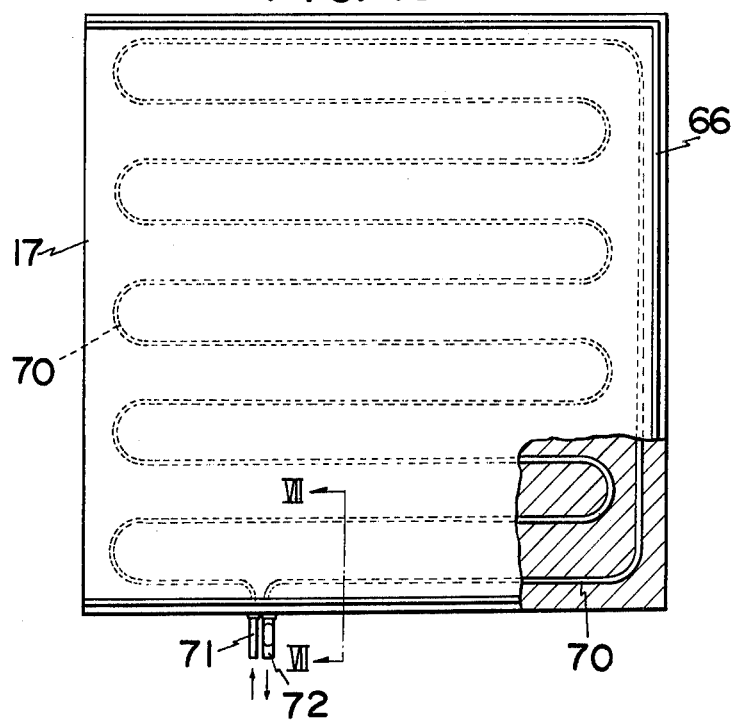
FIG. 18 is a plan view of another modified slag receiving means of this invention.
Figure 19:
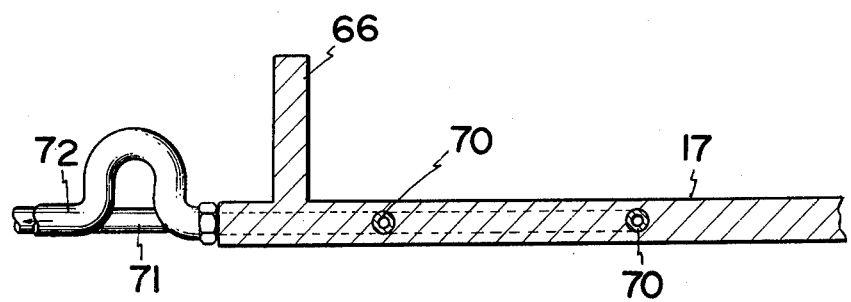
FIG. 19 is a cross sectional view of FIG. 18 taken along the line VII—VII in FIG. 18.
Figure 21:
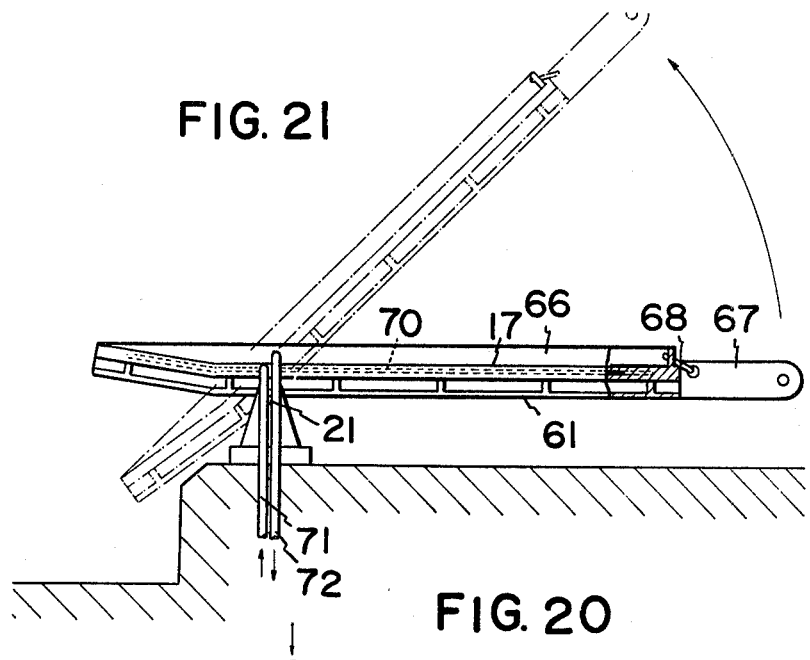
FIG. 21 is a plan view of still another slag receiving means of this invention.

In FIG. 18, numeral 70 indicates a pipe which is embedded in the slag holding pan 17. The pipe 70 has a water inlet 71 and a water outlet 72 adjacently disposed at one side of the slag holding pan 17 and repeats several turns within the slag holding pan 17 such that the pipe 70 covers the entire surface of the slag holding pan 17.

Since the water which passes through the several turns of pipes 20 embedded in the slag holding pan 17 cools the entire surface of the pan 17, the pan 17 will exhibit slight deformation even when the molten slag having a temperature up to about 1600° C is discharged onto the surface of the pan 17, whereby the pan 17 will have sufficient durability.

Figure 20:
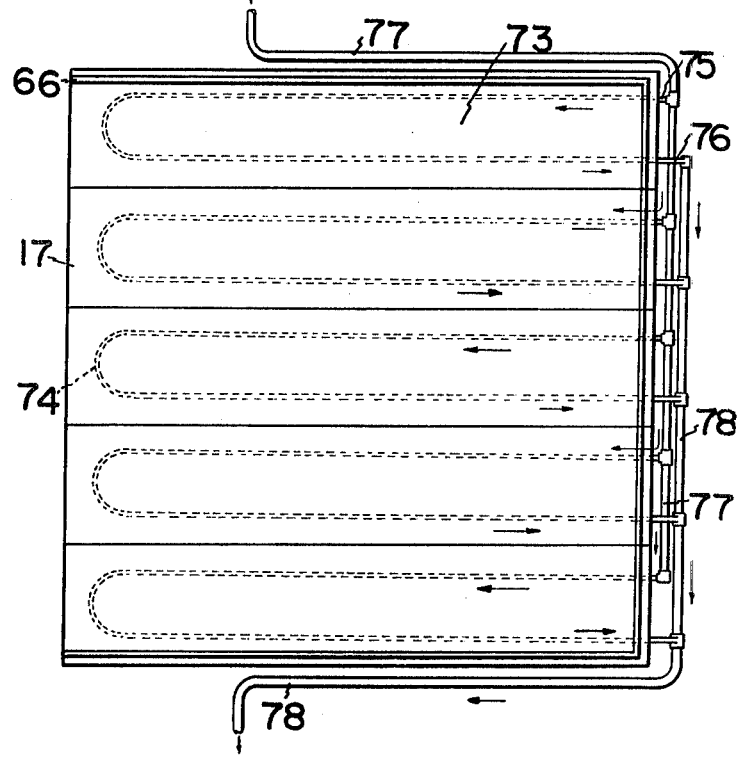
FIG. 20 is a side view of FIG. 18 with a part broken away.
Figure 22:
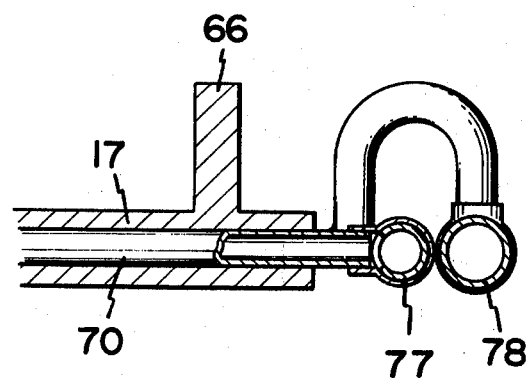
FIG. 22 is an enlarged cross sectional view of FIG. 21 showing the detail of the water supply tube and the water return tube.

As can be best understood from FIG. 20 and FIG. 22, the slag holding pan 17 can be divided into several sectional plates 73 wherein each sectional plate has a respective cooling water pipe 74 which has a water inlet 75 and a water outlet 76 respectively. These inlets 75 and outlets 76 are respectively connected to a main supply tube 77 and a main return tube 78.

Due to the above construction, the water cooling effect of the slag holding pan 17 is further improved.

It is noted that the same numerals are employed to indicate the respective parts throughout the description of the modifications of the slag receiving means 15.

While the described embodiments represent the preferred forms of the present invention, it is to be understood that modifications will occur to those skilled in the art without departing from the spirit of the invention. The scope of the invention is therefore to be determined solely by the appended claims.

What is claimed is:

1. Apparatus for processing molten slag from a steel making plant comprising means defining a covered area, a molten slag ladle movable between said steel making plant and said covered area, slag receiving means under said covered area for receiving said molten slag from said molten slag ladle, pivotal means pivotably mounting said slag receiving means, tiltable means for tilting said slag receiving means about said pivotal means, water cooling means disposed over said slag receiving means for discharging water onto said molten slag on said slag receiving means, slag bucket means disposed adjacent to said slag receiving means for receiving said slag when said slag receiving means is tilted by said tiltable means and the slag slides off of said tilted slag receiving means, a cooling water pit submergibly receiving said slag from said slag bucket means for effecting quenching thereof, and means for transferring said quenched slag from said cooling water pit.

2. Apparatus according to claim 1 wherein said covered area is a roofed slag processing factory having means on the roof thereof for expelling the vapor produced when said water is sprayed onto said molten slag on said slag receiving means.

3. Apparatus according to claim 1 wherein said slag receiving means comprises a frame means, a slag holding plate mounted on said frame means, said pivotal means pivotally mounting said frame means on one end of said frame means such that said slag receiving means is tiltable on said one end by said tiltable means.

4. Apparatus according to claim 1 comprising an overhead crane for moving said molten slag ladle, said overhead crane being movably mounted on girders which run at both sides of said covered area, said overhead crane having at least two crane hooks for tilting said molten slag ladle over said slag receiving means.

5. Apparatus according to claim 1 wherein at least two slag receiving means are provided, said water cooling means comprises sprinklers which are disposed between each two slag receiving means.

6. Apparatus according to claim 1 wherein said tiltable means is an overhead ladle crane which is movably mounted on said overhead crane having at least one crane hook for tilting said slag receiving means.

7. Apparatus according to claim 1 wherein said slag bucket is a box-shaped bucket which is replaceably mounted on a tram car which is movable from said covered area to a location adjacent to said cooling water pit.

8. Apparatus according to claim 1 wherein said slag bucket is a rotatable mounted bucket which is rotatable mounted by rotatable means on a tram car which is movable from said covered area to a location close to said cooling pit whereby the solidified slag in said slag bucket is discharged into said cooling pit by the rotation of said slag bucket.

9. Apparatus according to claim 1 wherein said slag bucket is an intermediate cooling bucket which is disposed between said slag receiving means and said cooling water pit, said intermediate cooling bucket being tiltable toward said cooling water pit whereby said solidified slag is discharged from said intermediate cooling bucket by tilting the latter.

10. Apparatus according to claim 9 wherein said intermediate cooling bucket includes a hydraulic cylinder for tilting said intermediate cooling bucket.

11. Apparatus according to claim 1 wherein said transferring means is a gantry crane which has at least one crab bucket which scoops said quenched slag from said cooling water pit and transfers said scooped slag onto a conveyor means.

12. Apparatus according to claim 1 wherein said transferring means is a gantry crane which has at least one crane hook for disposing said slag bucket containing said slag into said cooling water pit, and transferring said slag bucket from said cooling pit to a conveyor means.

13. Apparatus according to claim 1 comprising cooling water pipes extending through said slag receiving means.

* * * * *